United States Patent [19]
Mills et al.

[11] 4,364,426
[45] Dec. 21, 1982

[54] MOTORCYCLE TIRE TREAD

[75] Inventors: Anthony M. Mills, Williamsville; Daniel C. Egan, Akron, both of N.Y.

[73] Assignee: Dunlop Tire & Rubber Corporation, Buffalo, N.Y.

[21] Appl. No.: 247,873

[22] Filed: Mar. 26, 1981

[51] Int. Cl.³ .............................................. B60C 11/08
[52] U.S. Cl. ................................................ 152/209 R
[58] Field of Search ....... 152/209 R, 209 WT, 209 D, 152/352 R, 353 R; D12/136, 146-152

[56] References Cited

U.S. PATENT DOCUMENTS

| | | | |
|---|---|---|---|
| D. 107,287 | 11/1937 | Thomas | D12/148 |
| 3,841,372 | 10/1974 | Boileau | 152/209 R |
| 3,841,373 | 10/1974 | Gilreath | 152/209 B |
| 4,112,994 | 9/1978 | Mills et al. | 152/354 R |
| 4,282,915 | 8/1981 | Fontaine | 152/209 R |
| 4,305,445 | 12/1981 | Yoshioka et al. | 152/209 R |

FOREIGN PATENT DOCUMENTS 282181 12/1927 United Kingdom.
1366300 9/1974 United Kingdom.

*Primary Examiner*—Michael W. Ball
*Attorney, Agent, or Firm*—Stevens, Davis, Miller & Mosher

[57] ABSTRACT

A tire tread design is disclosed comprising a plurality of spaced tread blocks defined by a plurality of first grooves spaced circumferentially of said tire and extending generally diagonally across a tread, the first grooves channeling water from the center of the tread portion and extending continuously from one side of the tread portion to the other. Each first groove comprises an intermediate portion which extends substantially circumferentially of said tire, the intermediate portions of two adjacent first grooves being spaced by a tread block defined by adjacent first grooves.

14 Claims, 7 Drawing Figures

MOTORCYCLE TIRE TREAD

BACKGROUND OF THE INVENTION

The present invention relates to a tire tread design, especially for use on motorcycle tires.

Tire designers are continually seeking to improve on previous tread designs to optimize often conflicting performance requirements. A primary requirement for a suitable tire tread design is adequate clearance of water from the portion of the tread which contacts the road surface, i.e., the contact patch, to prevent hydroplaning and provide such handling on wet roads. The tread design should also have minimum sensitivity to road surface characteristics and must also have an adequate braking capability under both wet and dry conditions. The tread design should also reduce tread wear as much as possible.

For water clearance, various groove designs have been provided in tire treads to remove water from the contact patch. In most cases, water removing grooves run continuously and circumferentially of the tire. Unfortunately, a continuous circumferentially extending water removing groove can cause problems when the contact patch area is relatively narrow, such as occurs in a motorcycle tire which has a narrow rounded tread profile, as the groove can engage with and be guided by longitudinally extending areas of a road surface, such as rain grooves, joints and lane marking strips. On a road surface provided with such rain grooves, joints or lane marking strips, it is possible for a water channeling groove on the tire tread to follow the road surface characteristic instead of the command of a motorcycle rider, causing problems with driver control. Turning the wheel to dislodge a tire from a road surface characteristic can be difficult, requiring a jerking turning motion which may result in an unsafe operation of the motorcycle.

SUMMARY OF THE INVENTION

The present invention was designed to provide a unique tire tread construction which provides adequate water removal from the contact patch area while maximizing other desirable tread characteristics and improving driver control.

Accordingly, one object of the present invention is the provision of a tire tread pattern having a generally diagonal groove construction permitting improved water clearance from the contact patch, without providing a groove which runs continuously circumferentially of the tire. The diagonally oriented groove construction eliminates the possibility of the water channeling grooves locking onto and thus following longitudinal grooves, joints or lane marking strips provided on a road surface.

Another object of the invention is the provision of a tire tread pattern in which standing water in the contact patch is removed by the diagonally running water channeling grooves, while the edges of the water channeling grooves themselves and additional sipes and wedge grooves provided in the tread cut any remaining water film to provide a solid tire to road contact patch.

Another object of the invention is the provision of a tire tread pattern having generally diagonal water channeling grooves which cooperate with other circumferentially running water channeling grooves to provide a high degree of water removal from the contact patch area during both straight running of the tire as well as running on a portion of the tread adjacent the sidewall, such as occurs during hard turning of a motorcycle.

Another object of the invention is the provision of a tire tread pattern as above which is highly effective in removing water from the contact path area and which further includes additional circumferentially spaced holes or additional siping in the tread for absorbing minute water particles remaining at the contact patch area thereby maximizing gripping of the tread to the road surface.

Another object of the invention is the provision of a tire tread pattern as above having a high ratio of contact surface area to groove area which increases braking friction and allows the tire load and torque to be distributed more evenly over a larger area.

Another object of the invention is the provision of a tire tread pattern as above which provides large unbroken tread blocks to stabilize the contact patch thus reducing tread pattern squirm.

These and other objects and advantages of the tire tread construction of the invention will be more clearly seen from a detailed description which follows which is taken in connection with the accompanying drawings.

DETAILED DESCRIPTION OF THE INVENTION

Figure 1:
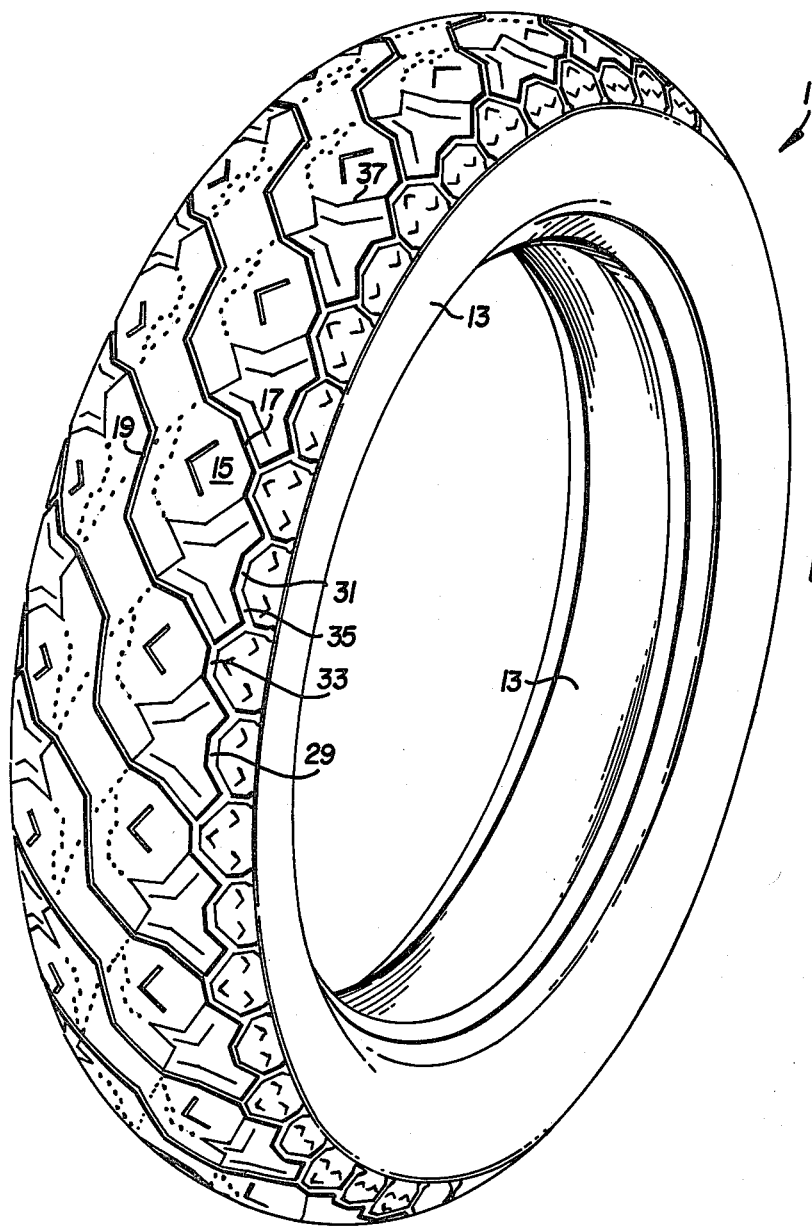
FIG. 1 illustrates in perspective view a motorcycle tire incorporating the tread construction of the invention.
Figure 2:
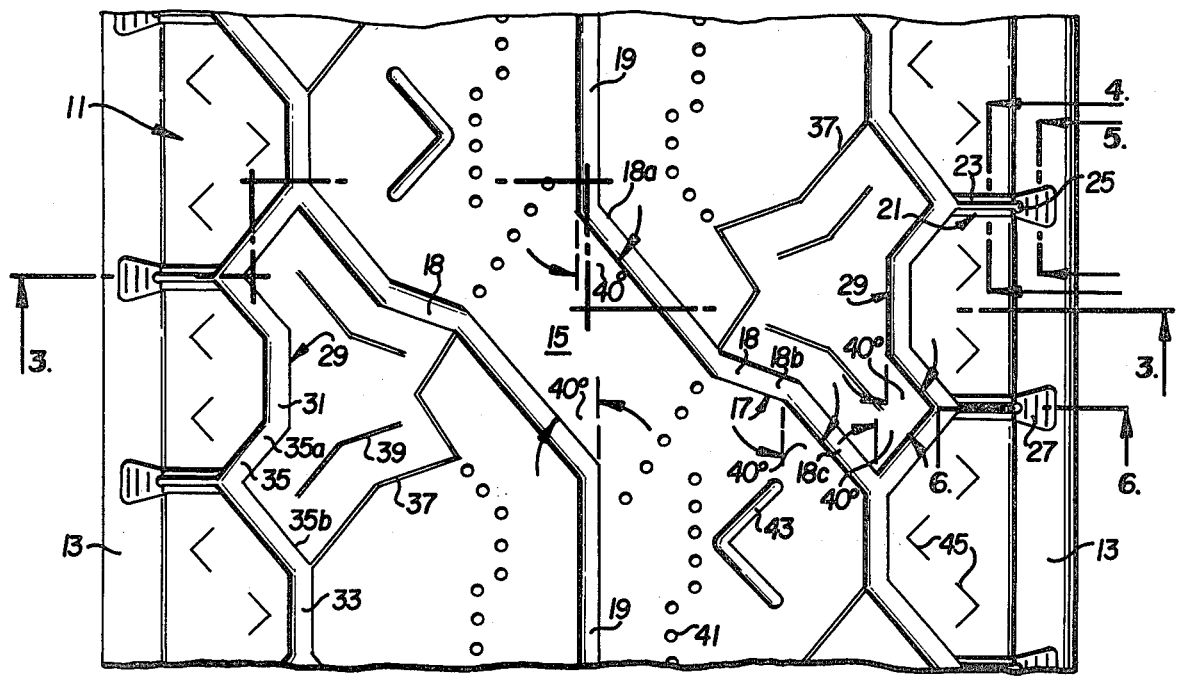
FIG. 2 shows a front view of a portion of the tire tread illustrated in FIG. 1.
Figure 3:
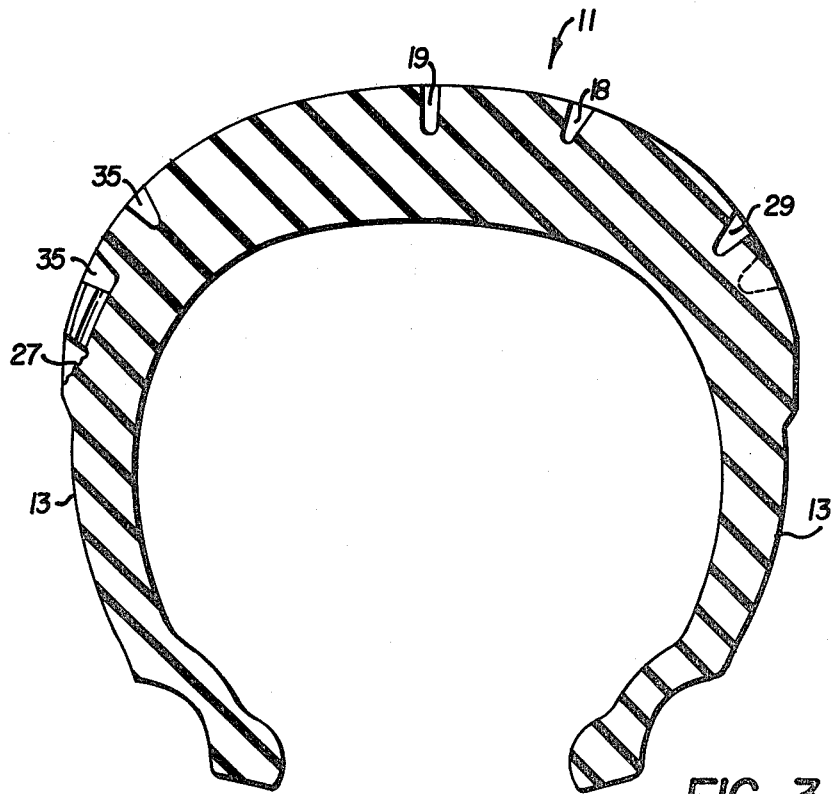
FIG. 3 illustrates a sectional view taken along the line 3—3 in FIG. 2.

FIGS. 1 and 2 show a tread portion 11 of a tire connected to sidewalls 13. Tread portion 11 contains a plurality of generally diagonally extending water channeling grooves 17 which run from one side of the tread portion to the other. The water channeling grooves 17 define between them a plurality of road-contacting tread blocks 15. The generally diagonal water channeling grooves ensure the absence of a continuous groove running circumferentially of the tire and prevent the tire from locking onto a longitudinally oriented road characteristic which might direct or deflect the travel path of the tire. The water channeling grooves 17 each comprise an intermediate portion 19 which runs in the circumferential direction of a tire and diagonal portions 18 running in zig-zag fashion from each of the opposite ends of the intermediate portions 19 to respective edges of the tread. Each of the diagonal portions 18 is formed by three connected groove segments 18a, 18b and 18c. Segments 18a and 18c are angled approximately 40° from the circumferential center line of the tire, while segment 18b is angled approximately 70° from the circumferential center line. The intermediate portions 19 of grooves 17 align in a circumferential direction of the tire in the center of tread portion 11 and are separated by portions of the blocks 15 defined by adjacent grooves 17.

A pair of water channeling grooves 29 are also provided adjacent respective edges of the tire tread portion 11. These grooves run circumferentially of the tire in a zig-zag pattern. The terminating ends of the diagonal water channeling grooves 17 (that is the terminating ends of groove portions 18 running from the intermediate portions 19) are respectively connected with the grooves 29.

The grooves 29 have successive circumferentially extending groove portions 31 and 33 which are connected by substantially V-shaped groove portions 35. The legs 35a, 35b of U-shaped portion 35 are angled approximately 40° from the circumferential center line of the tire. The successive circumferentially extending groove portions 31 and 33 are offset from one another by substantially the width of the second groove 29. The offsetting of the circumferentially extending second groove portions 31 and 33 and their interconnection by the substantially V-shaped groove portion 35 insures the absence of a straight groove pattern running circumferentially of the tire to prevent locking of the second grooves 29 with a longitudinal roadway surface characteristic when the tire is running adjacent the edges of the tread.

Figure 4:
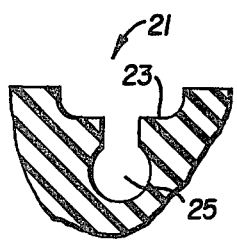
FIG. 4 illustrates a sectional view taken along the line 4—4 in FIG. 2.
Figure 5:
FIG. 5 illustrates a sectional view taken along the line 5—5 in FIG. 2.
Figure 6:
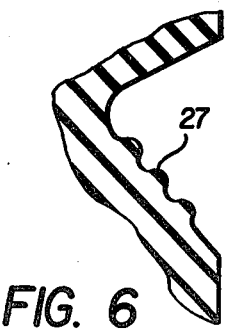
FIG. 6 illustrates a sectional view taken along the line 6—6 in FIG. 2.

As clearly recognized, water in the contact patch area of the tread, that is substantially in the middle of the tread portion is effectively conducted away by the grooves 17. In addition, water is conducted away from the grooves 17 into the grooves 29 which are connected to the opposite ends of the grooves 17. Additional water channeling away from the second grooves 29 to the edge of the tread is provided by grooves 21 which interconnect with grooves 29 and are regularly spaced at the edges of the tread circumferentially around the tire. The grooves 21 are each formed of first shallower but wider grooves 23 and second deeper but narrower tunnel like grooves 25, as more clearly illustrated in FIG. 4. At the terminus of the grooves 21 is a flared portion 27 having a ribbed surface, as more clearly illustrated in FIG. 6.

The blocks 15 defined by adjacent diagonal grooves 17 are further broken into smaller blocks by narrow siping grooves 37. The siping grooves 37 are much narrower than water channeling grooves 17, 21 and 29. The siping grooves increase the compliance of the tread by diminishing the size of the tread blocks. They also absorb water at the contact patch area, and provide additional road gripping edges. Additional siping grooves 39 are also provided within the blocks 15 for the same reason. Although the siping grooves 37 are arranged to sub-divide the blocks 15, substantial portions of the blocks 15 at the central portion of the tread 11 remain undivided to provide a large unbroken road contacting surface which reduces tread pattern squirm.

As further illustrated in FIGS. 1 and 2, additional V-shaped grooves 43 are provided within the blocks 15 and spaced along the circumference of the tire on opposite sides of the center of the tread. The angle between the legs 43a and 43b of the V-shaped grooves is approximately 100°. These additional V-shaped grooves also collect water which may be present in the contact patch area, add compliance to the tread surface, provide additional edges which facilitate gripping of the tread to a road surface and also dissipate heat.

Holes 41 may also provided within the blocks 15 along the circumferential extent of the tire. Holes 41 absorb minute water droplets at the contact patch area. The holes first fill with water droplets and air is compressed between the droplets residing in the holes and the road surface. The holes effectively act as gripping cells which provide added traction on a road surface. The air retained in the holes at the contact patch area also provides additional compliance to the tread pattern thus further assisting in tire gripping and braking action.

Figure 7:
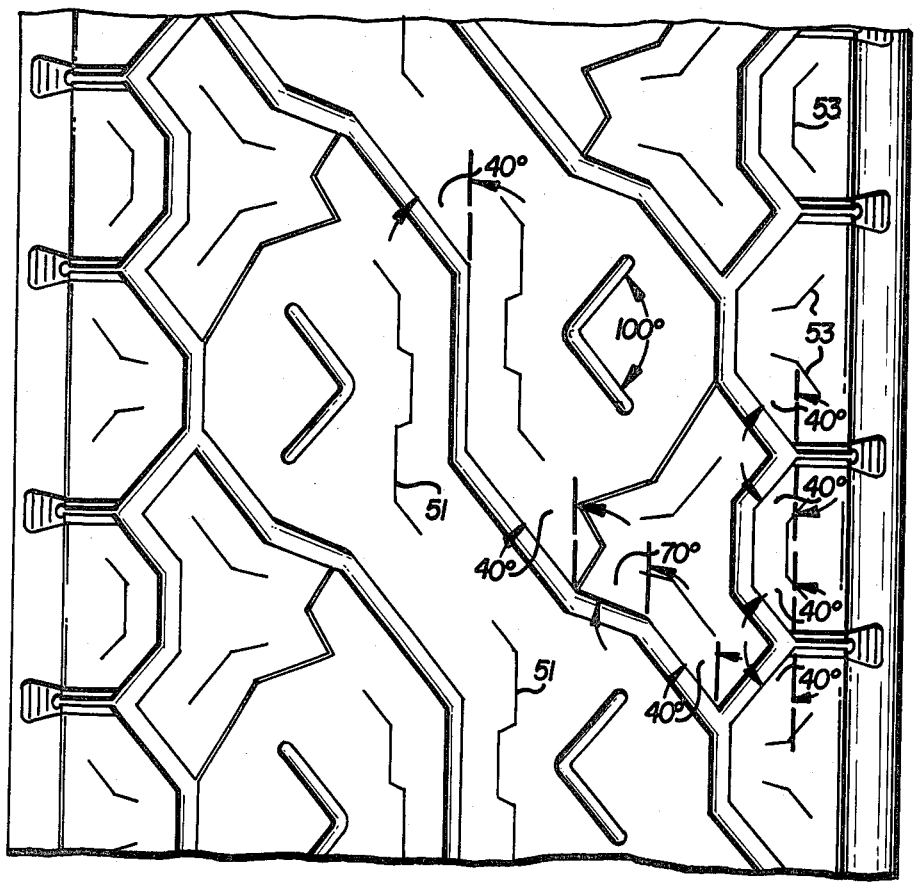
FIG. 7 shows a front view of a portion of tire tread having a modified tread construction.

The spacing of the holes to each other and to other grooved areas of the tire is at least one quarter of an inch ($\frac{1}{4}$") to insure the holes will not tear into each other to other structures upon the application of force to the tire tread such as during breaking and quick acceleration. In lieu of holes 41, additional siping grooves 51, similar to grooves, 37, can be provided in the tread at substantially the same circumferential position as holes 41, as illustrated in FIG. 7.

Additional V-shaped siping grooves 45 may be provided between the sidewall 13 of the tire and the pair of grooves 29 which are adjacent respective edges of the tread pattern. These siping grooves also serve to break up larger blocks of tread material adjacent the tread edges and additionally absorb small water droplets, dissipate heat, and provide additional edges to assure gripping of the tire tread to the road surface upon cornering. FIG. 7 shows the alternative use of angled siping grooves at the tread edges in place of the V-shaped siping grooves 45 illustrated in FIGS. 1 and 2.

As also illustrated in FIGS. 1 and 2 the water channeling grooves 17, 21, 29 and the siping and V-shaped grooves 37, 39 and 43 occupy a relatively small area as compared to the land areas formed by the tread blocks 15 thus ensuring a high degree of braking friction and the distribution of tire load and torque over a large area.

The tire construction as shown and described, obtains improved water removal from the contact patch area while eliminating continuous straight grooves running circumferentially of the tire. This insures that the tire tread, particularly that of a motorcycle tire, will not lock onto any longitudinal grooves, joints or lane markings provided in a road surface. In addition, the pattern as illustrated effectively channels water away from the contact patch area while providing enhanced compliance to the tread surface to insure better gripping of the tread to the road surface. The pattern also provides a large number of groove edges to further improve tire gripping.

Although preferred embodiments of the tire tread have been described and illustrated, it should be understood that various modifications can be made thereto without departing from the spirit and scope of the invention. Accordingly, the invention is not limited by the foregoing description, but it is only limited by the claims appended hereto.

What is claimed:

1. A road use motorcycle tire comprising a rounded tread portion and sidewalls depending from said tread portion, said tread portion comprising a plurality of spaced diagonally extending tread blocks defined by a plurality of first grooves spaced circumferentially of said tire and extending generally diagonally across said tread portion and a pair of second grooves provided adjacent opposite width-wise sides of said tread portion and extending circumferentially of said tire, said first grooves channeling water from said tread portion toward said sidewalls and extending continuously from one side of said tread portion to the other, each said first groove comprising an intermediate portion at the width-wise center of the tread portion which extends substantially circumferentially of said tire and a pair of diagonally extending portions respectively connecting opposite ends of said intermediate portion to respective second grooves, the intermediate portions of two adjacent first grooves being spaced by a said tread block defined by said adjacent first grooves and said second grooves, said tread blocks being uninterrupted by any circumferentially extending groove.

2. A tire as in claim 1 further comprising a plurality of siping grooves provided in each said tread blocks.

3. A tire as in claim 2 wherein at least some of said siping grooves subdivided said tread blocks defined by said first and second grooves.

4. A tire as in claim 1 further comprising a plurality of third grooves provided at both width wise sides of said tread portions and spaced along the circumferential length of each of said second grooves, each of said third grooves extending substantially radially of said tread portion and connecting with one of said second grooves.

5. A tire as in claim 1 wherein said second grooves follow a substantially zig-zag path along their circumferential length.

6. A tire as in claim 5 wherein each said second groove comprises a plurality of spaced groove portions extending in the circumferential direction of said tire, and a plurality of V-shaped groove portions interconnecting each two successive circumferentially extending groove portions.

7. A tire as in claim 6 wherein two successive circumferentially extending groove portions of each said second groove are out of circumferential alignment with each other.

8. A tire as in claim 1 wherein said first grooves follow a substantially zig-zag diagonally extending path except at said intermediate portions.

9. A tire as in claim 1 further comprises a plurality of spaced holes provided in said tread blocks.

10. A tire as in claim 1 further comprising a plurality of substantially V-shaped grooves provided in said tread blocks and spaced along the circumferential length of said tire.

11. A tire as in claim 10 wherein said V-shaped grooves are disposed on opposite sides of the center of said tread portion.

12. A tire as in claim 1 further comprising a plurality of siping grooves provided along the circumferential extent of said tire between said second grooves and the sidewalls respectively adjacent thereto.

13. A tire as in claim 12 wherein said siping grooves are angled.

14. A tire as in claim 13 wherein said siping grooves are V-shaped.

* * * * *